(12) United States Patent
Bertucci

(10) Patent No.: US 12,408,736 B1
(45) Date of Patent: Sep. 9, 2025

(54) WATER PROOF LEATHER WATCH BAND

(71) Applicant: MH BERTUCCI, INC., Gurnee, IL (US)

(72) Inventor: Michael H. Bertucci, Gurnee, IL (US)

(73) Assignee: MH BERTUCCI, INC., Gurnee, IL (US)

( * ) Notice: Subject to any disclaimer, the term of this patent is extended or adjusted under 35 U.S.C. 154(b) by 485 days.

(21) Appl. No.: 17/569,780

(22) Filed: Jan. 6, 2022

Related U.S. Application Data

(60) Provisional application No. 63/135,094, filed on Jan. 8, 2021.

(51) Int. Cl.
| | | |
|---|---|---|
| *A44C 5/00* | (2006.01) | |
| *B32B 3/26* | (2006.01) | |
| *B32B 7/09* | (2019.01) | |
| *B32B 9/02* | (2006.01) | |
| *B32B 9/04* | (2006.01) | |
| *B32B 27/34* | (2006.01) | |

(52) U.S. Cl.
CPC ............ *A44C 5/0053* (2013.01); *B32B 3/266* (2013.01); *B32B 7/09* (2019.01); *B32B 9/025* (2013.01); *B32B 9/045* (2013.01); *B32B 27/34* (2013.01); *B32B 2250/02* (2013.01); *B32B 2250/40* (2013.01); *B32B 2307/7265* (2013.01); *B32B 2307/732* (2013.01); *B32B 2437/00* (2013.01)

(58) Field of Classification Search
CPC ......... A44C 5/0053; B32B 7/09; B32B 3/266; B32B 9/025; B32B 9/045; B32B 27/34; B32B 2250/02; B32B 2250/40; B32B 2307/7265; B32B 2307/732
See application file for complete search history.

(56) References Cited

U.S. PATENT DOCUMENTS

| | | | | |
|---|---|---|---|---|
| 3,610,488 | A * | 10/1971 | Tracy | A44C 5/00 224/171 |
| 4,110,139 | A * | 8/1978 | Mashida | B29C 33/405 264/293 |
| D255,016 | S * | 5/1980 | Hofman | D11/3 |
| D257,335 | S * | 10/1980 | Hofman | D11/3 |
| 8,960,510 | B2 * | 2/2015 | Bertucci | A44C 5/0053 224/178 |
| 2015/0103638 | A1 * | 4/2015 | Leung | A44C 5/22 368/282 |

OTHER PUBLICATIONS

Watchuseek.com, "Best Lining Material for Watch Strap," Oct. 2016, https://www.watchuseek.com/threads/best-lining-material-for-watch-strap.3681106/ (Year: 2016).*

* cited by examiner

*Primary Examiner* — Corey N Skurdal
(74) *Attorney, Agent, or Firm* — Clark Hill PLC; James R. Foley

(57) ABSTRACT

An ultra durable leather watch band that sets a new standard in the industry. The watch band has long lasting durability and provides light weight comfort. Specifically, the watch band has a leather upper layer, a nylon lower later, and stitching which effectively mates and secures the layers together to form an integral watch band. Preferably, the top layer is made from high performance top grain water proof leather, and the bottom layer is made of very rugged nylon webbing that adds durability, long life wear, comfort and repels moisture. Preferably, the stitching is both rugged and waterproof. To that end, the stitching may be high performance nylon.

20 Claims, 4 Drawing Sheets

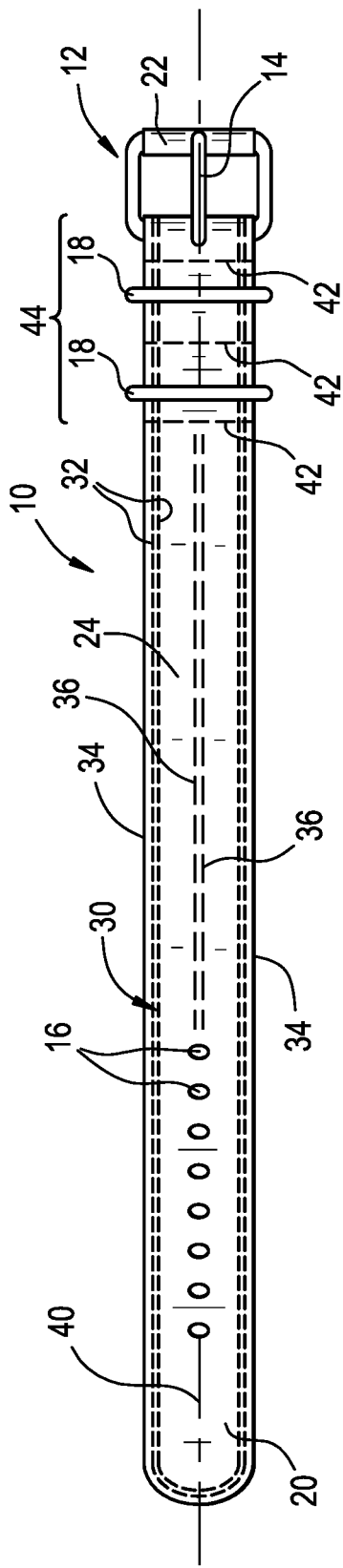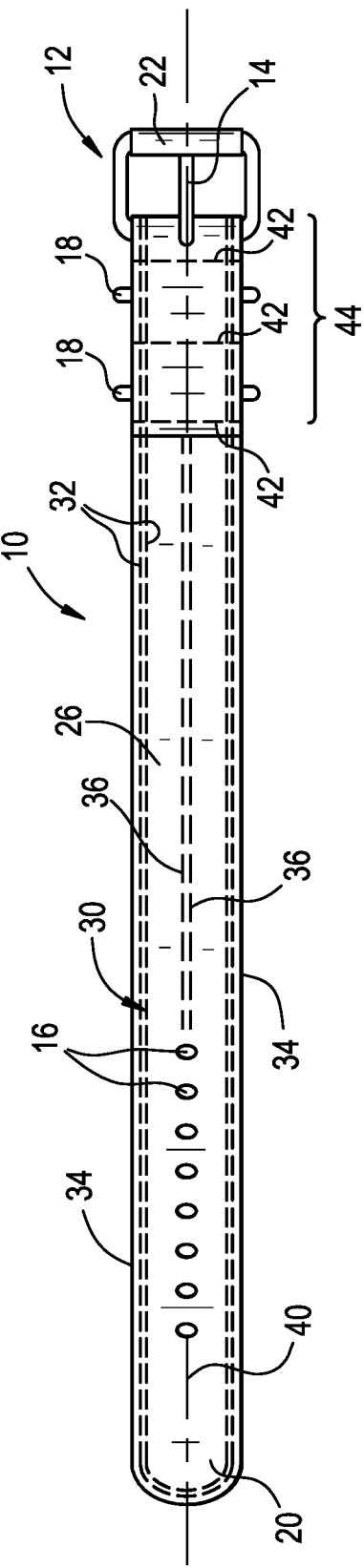

WATER PROOF LEATHER WATCH BAND

RELATED APPLICATION (PRIORITY CLAIM)

The present application claims the benefit of U.S. Provisional Application Ser. No. 63/135,094, filed Jan. 8, 2021, which is hereby incorporated by reference in its entirety.

BACKGROUND

The present invention generally relates to watch bands, and more specifically relates to water proof leather watch bands.

Watch bands made of rubber, silicone, metal or leather are all common in the watch industry. Typically, if someone wants a completely waterproof watch band, they choose rubber, silicone or metal as the material for the band because those materials naturally do not absorb water and therefore take no time to dry.

Genuine leather is a natural product. Unlike rubber, silicone or metal, leather generally acts like skin when it comes to moisture, meaning leather is incredibly porous, tends to absorb moisture, and is never completely waterproof.

Some leather watch bands are characterized as being waterproof. This means that the leather band has been treated (such as by being sprayed with a chemical) to generally repel water, but the watch band will still generally absorb water leaving it wet and needing time to dry.

Some leather watch bands are meter-rated waterproof, wherein the meter rating lets the consumer know how deep the watch band has been tested (i.e., regarding exposure to water via submersion in water to a certain depth).

Some leather watch bands are characterized as being water resistant. This means they have been treated (such as via a tanning process which turns the leather generally hydrophobic), and therefore can tolerate a small splash and some moisture. However, even after being treated to become water-resistant, the water-resistant leather watch band is still not intended for use in water, such as while swimming or taking a shower. In other words, a water-resistant leather watch band will still tend to get water damaged if either submerged in water or worn in the shower. Generally speaking, substantial exposure to water will greatly reduce the life span of a water-resistant leather watch band. More specifically, the water can damage the watch band and cause the watch band to stain, discolor or deteriorate prematurely.

Even if one is careful while wearing a watch having a leather watch band, the leather watch band is still naturally subjected to moisture from the inside in the form of sweat from the user who is wearing the watch. As a result, the inside of the watch band can become stained, and can even end up peeling and cracking as a result of being continuously exposed to sweat while being worn by the user.

SUMMARY

One object of an embodiment of the present invention is to provide an ultra durable leather watch band.

Another object of an embodiment of the present invention is to provide a leather watch band that sets a new standard for leather watch bands in the industry.

Another object of an embodiment of the present invention is to provide a leather watch band that has long lasting durability and provides light weight comfort.

Briefly, an embodiment of the present invention provides a watch band that has a leather upper layer, a nylon lower layer, and stitching which effectively mates and secures the layers together to form an integral watch band. Preferably, the top layer is made from high performance top grain water proof leather, and the bottom layer is made of very rugged nylon webbing that adds durability, long life wear, comfort and repels moisture. Preferably, the watch band is both rugged and waterproof. To that end, the stitching may be high performance nylon. The stitching may be provided in the form of six rows-two rows which wrap around the band, generally along the perimeter, and two additional rows of stitching are provided near the middle of the watch band.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIG. 1 is a front view of a watch band which is in accordance with an embodiment of the present invention;

FIG. 2 is a back view of the watch band shown in FIG. 1;

DESCRIPTION

Figure 3:
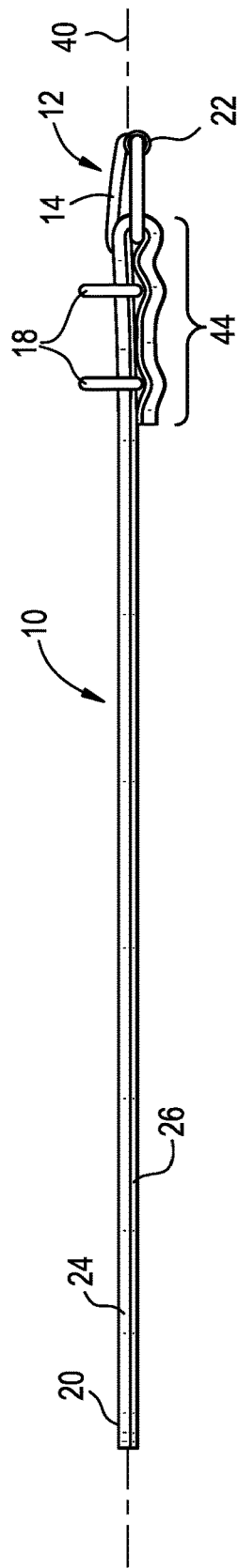
FIG. 3 is a view of the left side of the watch band shown in FIG. 1.

While this invention may be susceptible to embodiment in different forms, there is shown in the drawings and will be described herein in detail, a specific embodiment with the understanding that the present disclosure is to be considered an exemplification of the principles of the invention and is not intended to limit the invention to that as illustrated.

The Figures illustrate a watch band 10 that is in accordance with an embodiment of the present invention. The watch band 10 is an ultra durable, sets a new standard for leather watch bands in the industry, and has long lasting durability and provides light weight comfort.

As shown in the Figures, preferably the watch band 10 has a buckle 12 which includes a buckle tongue 14, adjustment holes 16 (shown in FIGS. 1, 2 and 7) for receiving the buckle tongue 14, and a pair of keeper loops 18 for retaining the end portion 20 of the watch band 10. As shown, the buckle 12 may also include a roller sleeve 22 which tends to assist in either putting the watch on or adjusting the band.

FIG. 1 provides a top view of the watch band 10. Preferably, the top layer 24 is made from high performance top grain water proof leather.

FIG. 2 provides a bottom view of the watch band 10. Preferably, the bottom layer 26 is made from nylon, specifically a very rugged, water proof nylon webbing that adds durability, long life wear, comfort and repels moisture. This layer adds to the tensile strength of the watch band 10 and provides that the watch band 10 wears better, dries faster, and is more comfortable on the wrist, effectively better supporting the top, leather layer 24 for more durability.

Figure 4:
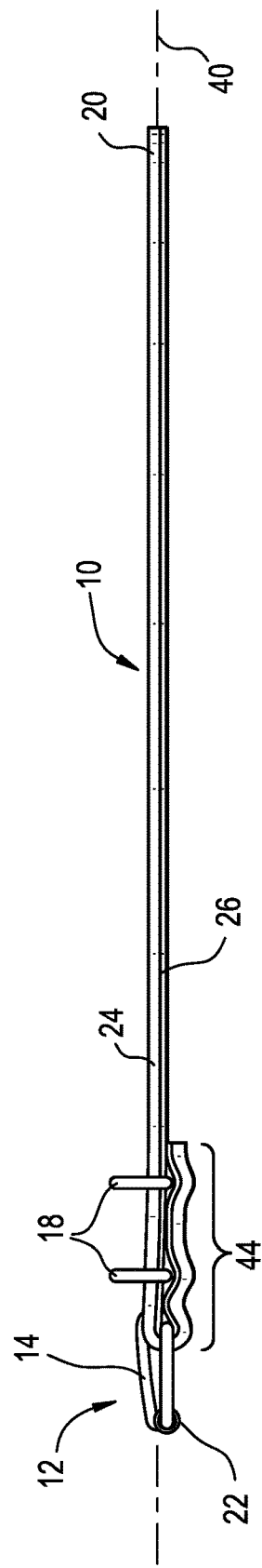
FIG. 4 is a view of the right side of the watch band shown in FIG. 1.
Figure 5:
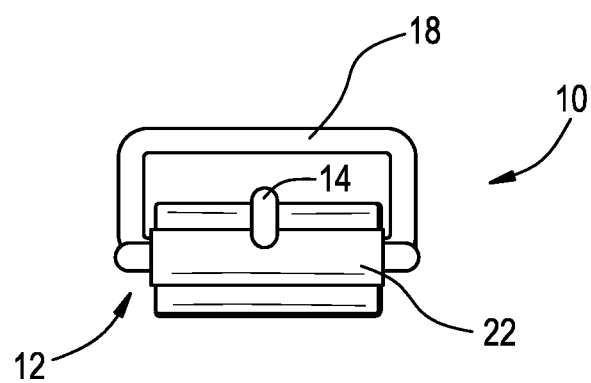
FIG. 5 is a view of one end of the watch band shown in FIG. 1.
Figure 6:
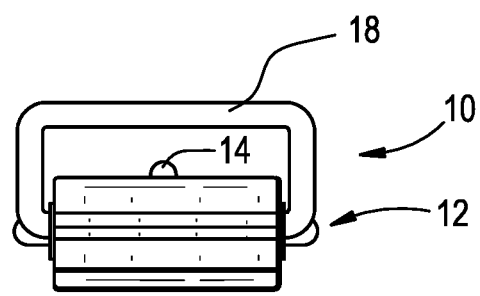
FIG. 6 is a view of the other end of the watch band shown in FIG. 1.

FIGS. 3 and 4 provide side views of the watch band 10—specifically FIG. 3 is a view of the left side and FIG. 4 is a view of the right side. As shown in FIGS. 3 and 4, preferably the watch band generally only consists of two layers—i.e., the top, leather layer 24 and the bottom, nylon layer 26. Preferably, the top, leather layer 24 is thicker than the bottom, nylon layer 26. For example, the watch band 10 may be 3.2 mm thick with the top, leather layer 24 accounting for 2 mm of the thickness and the bottom, nylon layer 26 accounting for 1.2 mm of the thickness. Of course, other thicknesses and variations are entirely possible while still staying very much within the scope of the present invention.

In addition to the top and bottom layers being what they are to provide water proof advantages, preferably the watch band 10 has unique stitching 30 as well. The stitching effectively mates and secures the top layer 24 and bottom layer 26 together to form an integral watch band 10. The stitching is preferably high performance, waterproof nylon.

Figure 7:
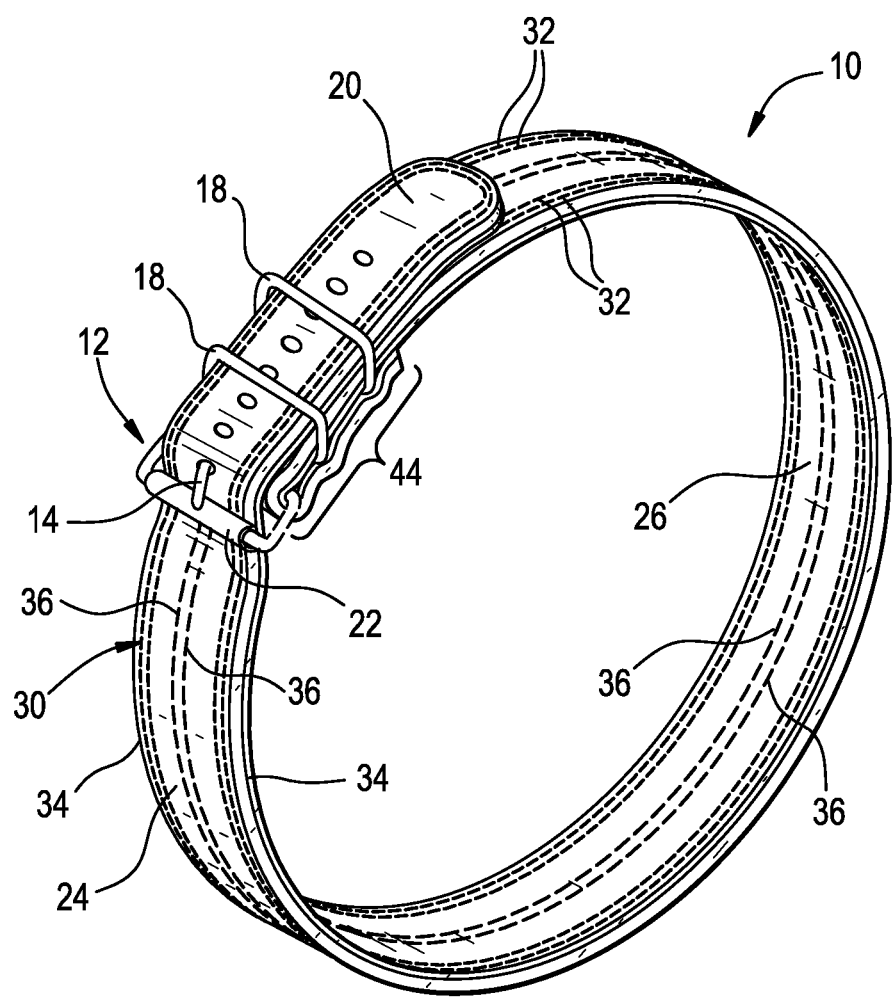
FIG. 7 is a perspective view of the watch band shown in FIG. 1.

As shown in FIGS. 1, 2 and 7, the stitching 30 may include two rows 32 which are proximate the edge 34 of the watch band (thereby effectively providing four rows of stitching when looking at the top layer 24 of the watch band 10, as shown in FIG. 1). As shown in FIG. 2, these lines of stitching may start on the back of the watch band, come around to the front, and work their way generally along the edge 34 of the watch band 10, and make their way to the back again. As such, these rows 32 of stitching 32 are really only two lines but look like four lines from the top (see FIG. 1) of the watch band 10. In addition to these lines 32 of stitching, preferably there are two rows 36 of stitching that are provided near the middle of the watch band 10 (i.e., along each side of a longitudinal axis 40 of the watch band 10) to provide even more support regarding securing the top layer 24 and bottom layer 26 together.

Preferably, the buckle tongue 14 and the adjustment holes 16 are provided generally along the longitudinal axis 40 as well, thereby providing that the watch band 10 is generally symmetrical with regard to the longitudinal axis 40. As shown in FIGS. 1 and 2, preferably there are three or more lines 42 of stitching that go across the watch band 10 (i.e., generally perpendicular to the longitudinal axis 40 of the watch band 10) which effectively secure the keeper loops 18 and buckle 12 to the watch band 10 within a four layer sandwich 44 (i.e., given that the watch band 10 is comprised of two layers 24 and 26 but is bent on top of itself in this area), thereby providing that the watch band 10 is, overall, an integral unit.

As such, six lines of stitching are effectively provided along the length of the watch band 10 going from the four layer sandwich 44 (in which the buckle 12 and keeper loops 18 are secured) to where the adjustment holes 16 begin. This not only provides enhanced style but also provides that the top, leather layer 24 and the bottom, nylon layer 26 are well secured together thereby adding to the waterproof nature of the watch band 10. Preferably, the stitching 30 has a color which contrasts with the top, leather layer 24, but tends to blend in with the color of the bottom, nylon layer 26.

While a specific embodiment of the invention has been shown and described, it is envisioned that those skilled in the art may devise various modifications without departing from the spirit and scope of the present invention.

What is claimed is:

1. A watch band comprising a top layer made of leather; bottom layer made of nylon; a buckle and at least one keeper loop, wherein the top layer and the bottom layer are connected to each other, wherein the bottom layer wraps around the buckle, contacts itself, and captures the at least one keeper loop therebetween, wherein the top layer comprises an inner surface and an outer surface, wherein the bottom layer comprises an inner surface and an outer surface, wherein the inner surface of the top layer is in contact with the inner surface of the bottom layer, wherein the outer surface of the bottom layer is in contact with the outer surface of the bottom layer and is not in contact with the outer surface of the top layer in an area between an end of the bottom layer and the buckle, wherein the outer surface of the bottom layer contacts the outer surface of the bottom layer within a four layer sandwich portion of the watch band and the outer surface of the bottom layer does not contact the outer surface of the top surface within the four layer sandwich portion of the watch band.

2. A watch band as recited in claim 1, wherein the top layer is thicker than the bottom layer.

3. A watch band as recited in claim 1, wherein the top layer is more than 1.5 times thicker than the bottom layer.

4. A watch band as recited in claim 1, wherein the top layer and the bottom layer are connected to each other via stitching.

5. A watch band as recited in claim 1, wherein the top layer and the bottom layer are connected to each other via stitching, and wherein the stitching mates and secures the top layer and the bottom layer together such that the watch band comprises an integral watch band.

6. A watch band as recited in claim 1, wherein the top layer and the bottom layer are connected to each other via stitching, and wherein the stitching is made of nylon.

7. A watch band as recited in claim 1, wherein the top layer and the bottom layer are connected to each other via stitching, and wherein the stitching is made of the same material as the bottom layer.

8. A watch band as recited in claim 1, wherein the top layer and the bottom layer are connected to each other via stitching, and wherein the watch band comprises an edge, wherein the stitching comprises two rows which are proximate the edge.

9. A watch band as recited in claim 1, wherein the top layer and the bottom layer are connected to each other via stitching, wherein the watch band comprises an edge, wherein the stitching comprises two rows which are proximate the edge, and wherein the stitching comprises four rows of stitching when looking at the top layer of the watch band.

10. A watch band as recited in claim 1, wherein the top layer and the bottom layer are connected to each other via stitching, wherein the watch band comprises an edge, wherein the stitching comprises two rows which are proximate the edge, wherein the stitching comprises four rows of stitching when looking at the top layer of the watch band, wherein the watch band comprises a front and a back, and wherein the stitching comprises lines of stitching that start on the back of the watch band, come around to the front of the watch band, work their way along the edge of the watch band, and make their way to the back of the watch band again.

11. A watch band as recited in claim 1, wherein the top layer and the bottom layer are connected to each other via stitching, wherein the watch band comprises an edge, wherein the stitching comprises two rows which are proximate the edge, wherein the stitching comprises four rows of stitching when looking at the top layer of the watch band, wherein the watch band comprises a front and a back, wherein the stitching comprises lines of stitching that start on the back of the watch band, come around to the front of the watch band, work their way along the edge of the watch band, and make their way to the back of the watch band again, and wherein the rows of stitching comprise two lines but look like four lines from the top of the watch band.

12. A watch band as recited in claim 1, wherein the top layer and the bottom layer are connected to each other via stitching, wherein the watch band comprises an edge, wherein the stitching comprises two rows which are proximate the edge, wherein the stitching comprises four rows of stitching when looking at the top layer of the watch band, wherein the watch band comprises a front and a back, wherein the stitching comprises lines of stitching that start on the back of the watch band, come around to the front of the watch band, work their way along the edge of the watch band, and make their way to the back of the watch band again, wherein the rows of stitching comprise two lines but look like four lines from the top of the watch band, wherein the watch band has a middle, and wherein there are two rows of stitching proximate the middle of the watch band.

13. A watch band as recited in claim 1, wherein the top layer and the bottom layer are connected to each other via stitching, wherein the watch band comprises an edge, wherein the stitching comprises two rows which are proximate the edge, wherein the stitching comprises four rows of stitching when looking at the top layer of the watch band, wherein the watch band comprises a front and a back, wherein the stitching comprises lines of stitching that start on the back of the watch band, come around to the front of the watch band, work their way along the edge of the watch band, and make their way to the back of the watch band again, wherein the rows of stitching comprise two lines but look like four lines from the top of the watch band, wherein the watch band has a middle, wherein there are two rows of stitching proximate the middle of the watch band, wherein the watch band comprises a longitudinal axis, and wherein the two rows of stitching are along each side of the longitudinal axis of the watch band to provide support regarding securing the top layer and the bottom layer together.

14. A watch band as recited in claim 1, wherein the watch band comprises an end portion, wherein the buckle comprises a buckle tongue, further comprising adjustment holes adapted to receive the buckle tongue, wherein the at least one keeper loop comprises a pair of keeper loops for retaining the end portion of the watch band.

15. A watch band as recited in claim 1, wherein the watch band comprises an end portion, wherein the buckle comprises a buckle tongue, further comprising adjustment holes adapted to receive the buckle tongue, wherein the at least one keeper loop comprises a pair of keeper loops for retaining the end portion of the watch band, and wherein the buckle comprises a roller sleeve adapted to assist in putting the watch band on and adjusting the watch band.

16. A watch band as recited in claim 1, wherein the top layer comprises high performance top grain water proof leather.

17. A watch band as recited in claim 1, wherein the bottom layer comprises a water resistant nylon webbing adapted to add durability, long life wear, comfort and repel moisture.

18. A watch band as recited in claim 1, wherein the bottom layer comprises a water resistant nylon webbing adapted to add durability, long life wear, comfort and repel moisture, and wherein the bottom layer is adapted to increase the tensile strength of the watch band and provide that the watch band wears better, dries faster, and is more comfortable on the wrist, supporting the top layer for more durability.

19. A watch band as recited in claim 1, wherein the watch band watch band consists of only two layers—the top, leather layer and the bottom, nylon layer.

20. A watch band as recited in claim 1, wherein the watch band comprises an end portion, wherein the buckle comprises a buckle tongue, further comprising adjustment holes adapted to receive the buckle tongue, wherein the at least one keeper loop comprises a pair of keeper loops for retaining the end portion of the watch band, wherein the watch band comprises a longitudinal axis, further comprising at least three lines of stitching that go across the watch band, perpendicular to the longitudinal axis of the watch band, which secure the keeper loops and buckle to the watch band within the four layer sandwich, and wherein six lines of stitching are provided along the length of the watch band going from the four layer sandwich, in which the buckle and keeper loops are secured, to where the adjustment holes begin.

\* \* \* \* \*